(12) United States Patent
Hadley

(10) Patent No.: US 6,772,329 B1  
(45) Date of Patent: Aug. 3, 2004

(54) SCSI PHASE SPECIFIC BUS RESET GENERATOR

(75) Inventor: Andrew Hadley, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 687 days.

(21) Appl. No.: 09/836,895

(22) Filed: Apr. 17, 2001

(51) Int. Cl.⁷ .............................................. G06F 1/24
(52) U.S. Cl. ..................................... 713/1; 713/100
(58) Field of Search ............................. 713/1, 2, 100; 710/100, 104, 107

(56) References Cited

U.S. PATENT DOCUMENTS 6,256,695 B1 * 7/2001 Williams .................... 710/107
6,374,322 B1 * 4/2002 Saze et al. .................. 710/316
6,510,532 B1 * 1/2003 Pelly et al. ................... 714/43
6,574,755 B1 * 6/2003 Seon ............................ 714/56

* cited by examiner

Primary Examiner—Dennis M. Butler
(74) Attorney, Agent, or Firm—Suiter West PC LLO

(57) ABSTRACT

The present invention is a bus reset generator capable of asserting a reset upon detection of a desired phase. The bus reset generator may analyze control signals from a bus, and based upon the control signals may determine the current phase of the bus. If the current phase is the desired phase for a reset, then a reset may be asserted. If the current phase is not the desired phase, the bus reset generator may continue to find the desired phase.

19 Claims, 4 Drawing Sheets

SCSI PHASE SPECIFIC BUS RESET GENERATOR

FIELD OF THE INVENTION

The present invention relates generally to a bus reset generator and more particularly to a phase specific bus reset generator.

BACKGROUND OF THE INVENTION

Small Computer System Interface (SCSI) is a computer industry standard for connecting computers to peripheral devices such as hard drives, CD-ROM drives, printers, scanners, and the like. A SCSI bus is a bus that conforms to the physical and electrical specifications of the SCSI standard. It is beneficial to perform testing of a bus reset during all times and phases of the SCSI bus. SCSI buses operate in intervals of time referred to as bus phases.

SCSI analyzers known to the art allow asynchronous assertion of a SCSI bus reset. The reset may be utilized to immediately clear all SCSI devices from the bus. When a reset is asserted, the SCSI bus may be operating in any one of its phases, however, even after multiple resets at random times, it may not be possible to test all phases of the SCSI bus.

Consequently, it would be advantageous if an apparatus and method existed which could assert a SCSI reset in a specific phase. It would also be advantageous if a method and apparatus could test all phases of a SCSI bus to ensure correct operation in all bus phases.

SUMMARY OF THE INVENTION

Accordingly, the present invention is directed to an apparatus and method for generating a phase specific SCSI bus reset. The apparatus and method of the present invention may be capable of detecting the operating phase of an SCSI bus. Upon detection of a desired phase for testing, the apparatus and method of the present invention may generate a bus reset.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to an embodiment of the invention, examples of which are illustrated in the accompanying drawings.

Figure 1:
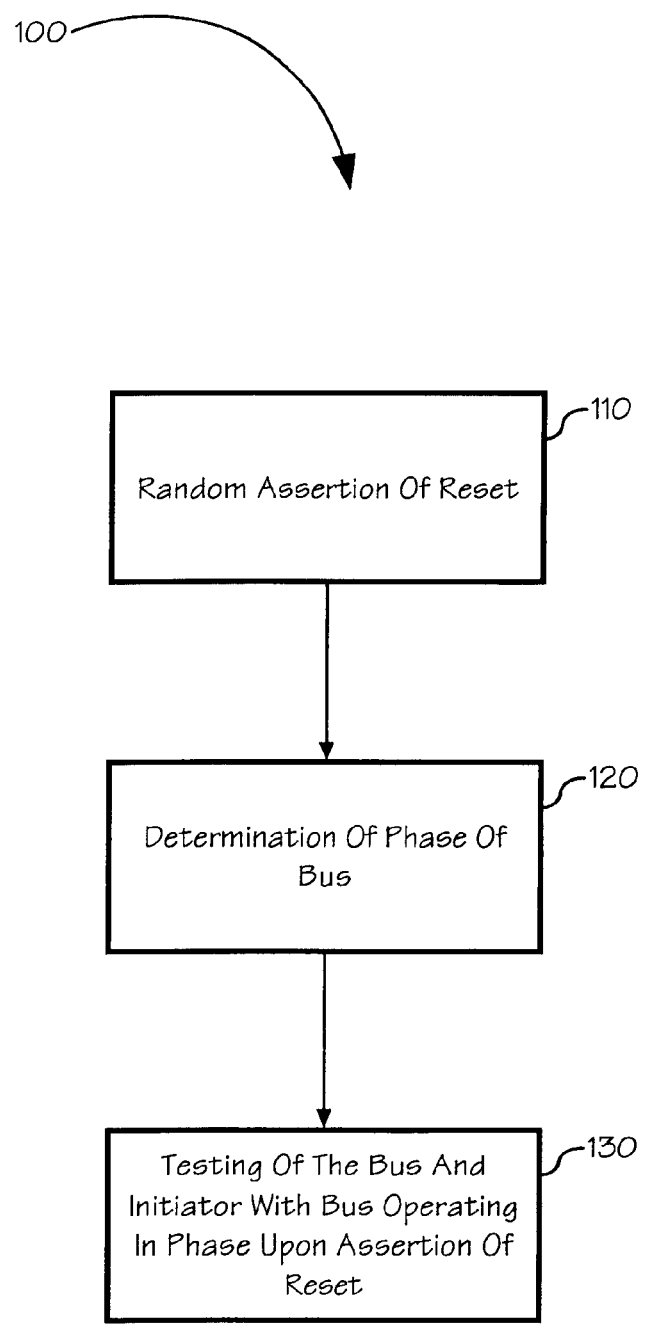
FIG. 1 depicts an embodiment of process of generating a bus reset known to the art.

Referring now to FIG. 1, an embodiment of a process 100 of generating a bus reset known to the art is shown. The Small Computer System Interface (SCSI) is a protocol that permits connection of a variety of devices, such as peripherals and components, modems, disk drives, printers, scanners, input/output devices, optical devices, test equipment, and the like, to a host information handling system. There are a variety of SCSI formats, including typical SCSI, SCSI-2, and the like. A bus in accordance with the SCSI protocol may serve as an interface system to connect a number of devices and transfer information. Typically, the SCSI bus may be time-shared, which allows greater and more efficient usage of the available bus bandwidth.

To achieve and manage the transfer of data and commands, the bus may assume a variety of phases. These phases may include bus free, message in, message out, command, st data in, st data out, dt data in, dt data out, selection, reselection and status phase. Previously, it was difficult if not impossible to determine whether a desired phase was entered by the SCSI device due to the asynchronous nature a SCSI reset on a SCSI analyzer. As a result, a random assertion of a SCSI reset has been utilized 110. A determination of the phase of the SCSI bus at the time of the reset can be made 120. At that point, testing of an overall system upon the reset while the bus was operating in a given phase may be accomplished 130. Since the process of generating a bus reset known to the art does not allow for generation of a reset in a desired specific phase, testing of the SCSI bus reset may be incomplete and not satisfactory.

Figure 2:
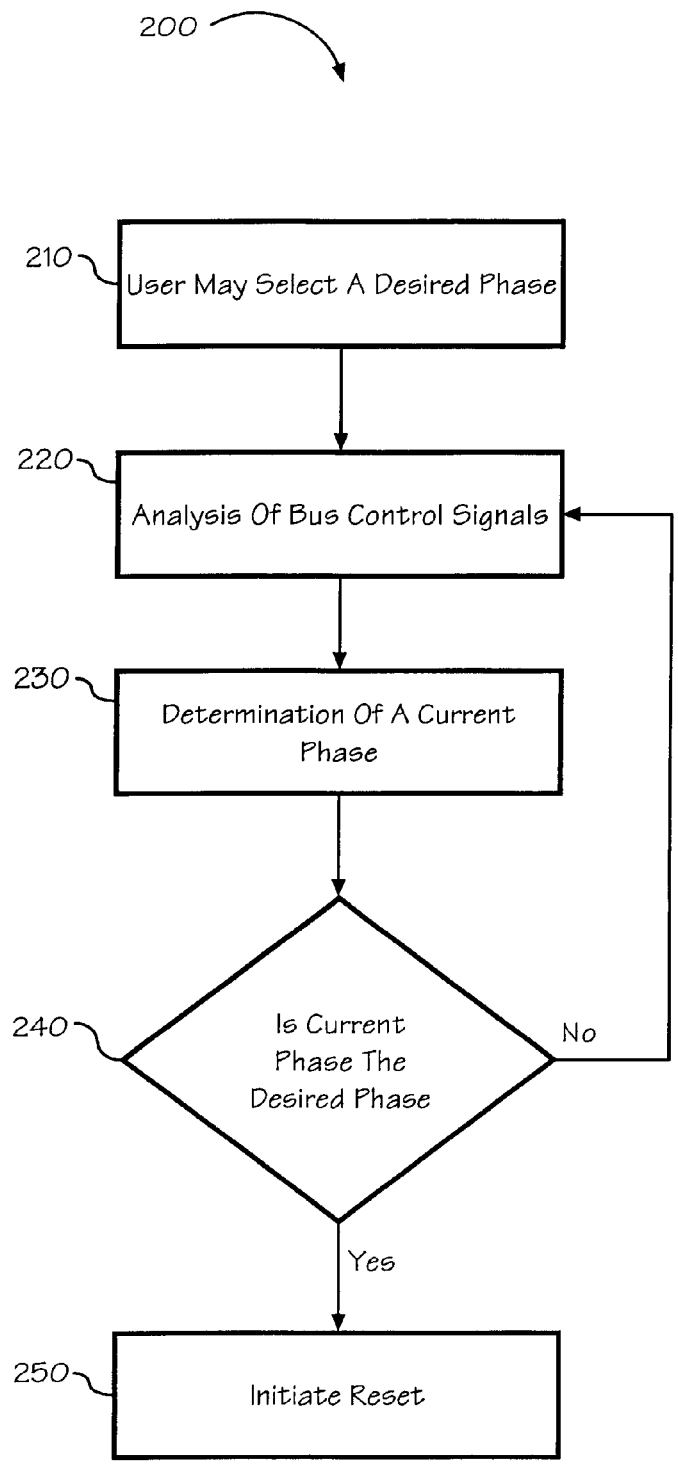
FIG. 2 depicts an exemplary embodiment of a process in accordance with the present invention for generating a bus reset upon detection of a specific phase.

Referring to FIG. 2, an exemplary embodiment of a process in accordance with the present invention for generating a bus reset upon detection of a specific user-requested phase is shown. The present invention may allow assertion of a SCSI reset in a specific user-identified phase. For example, a user may be capable of selecting a desired phase 210. An example of a phase of a SCSI bus is bus free. Thus if a user selects bus free, the present invention may be capable of asserting a SCSI reset when the bus is operating in a bus free phase.

Typical SCSI buses utilize twenty-seven signals. Nine of the signals are control signals which may be used to develop logical bus phases and eighteen are for data signals. The state of the signals and the previous phase may be utilized to determine the current phase. As a result, bus control signals may be analyzed 220 to make a determination of a current phase 230. When a current phase has been determined, a comparison of the current phase and the desired phase may be accomplished 240.

If the desired phase is the current phase, a RESET line may be asserted 250. There may be an approximate 100 nanosecond turn-around time for assertion of the reset, however, each phase generally may have a duration of five to six microseconds. If the desired phase is not the current phase, then the process may return to a further analysis of the bus control signals 220 forming a loop. This process may continue until a desired phase is detected and a reset asserted. In an alternative embodiment, the process may terminate after a given number of iterations.

In an exemplary embodiment of the present invention, a series of bus resets may be asserted on each phase. For example, the first desired phase for a bus reset may be the bus free phase. Upon detection that the current phase is bus free, a reset may be asserted. This process may continue until each phase has been found and a reset has been asserted.

Figure 3:
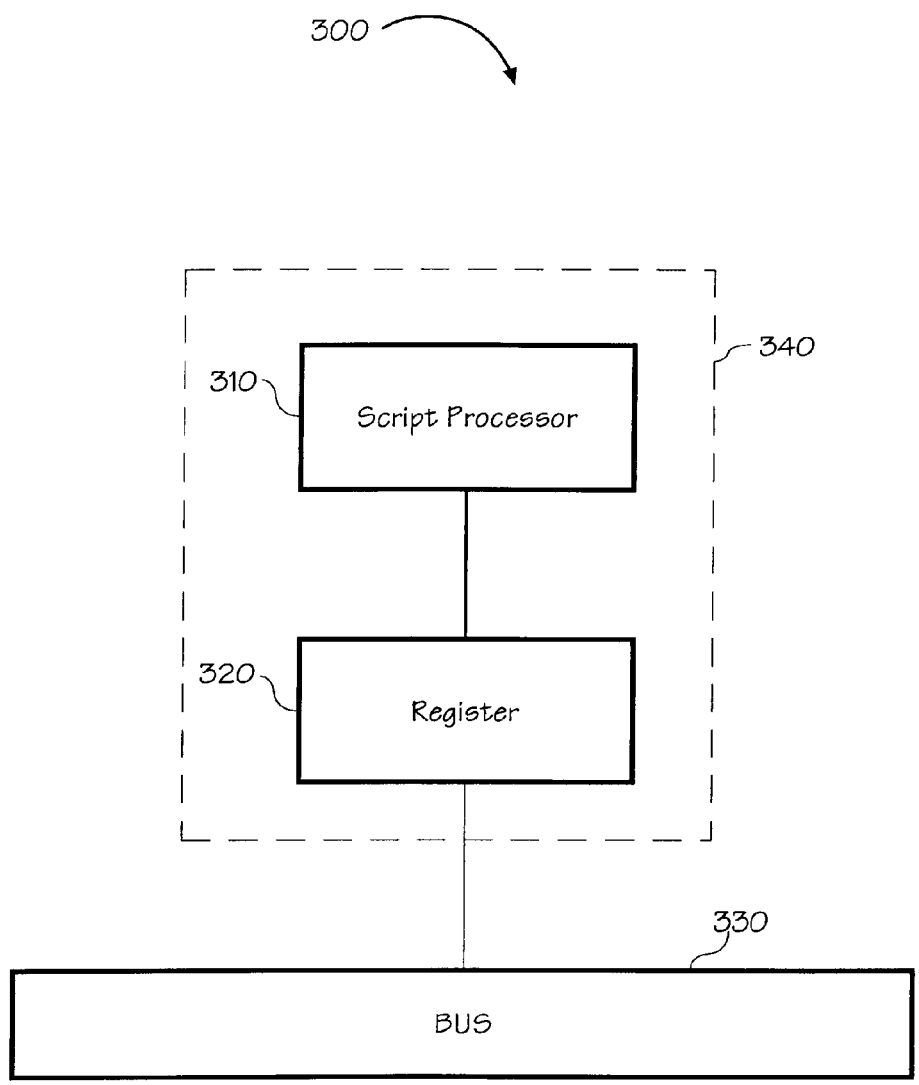
FIG. 3 depicts an exemplary embodiment of a phase specific bus reset generator of the present invention.

Referring to FIG. 3, an embodiment of a specific phase bus reset generator 300 of the present invention is shown. A bus 330, a SCSI bus for example, may utilize control signals to develop logical bus phases. The control signals and the previous phase may be utilized to determine the current phase of the bus. A register 320 may be utilized to represent the live control signals from the SCSI bus. In an exemplary embodiment of the invention, the register may be an 8-bit read-only register. Eight control signals may be monitored and based upon those control signals, the phase of the bus may be determined. A script processor 310 may be connected to the register and may be capable of processing the state of the SCSI bus and the active phases. Further, upon detection of a specific desired phase, script processor 310 may assert a reset.

An output device, not shown, may be utilized for display of the information produced by the specific phase bus reset generator of the present invention. In an exemplary embodiment of the present invention, the script processor 310 and the register 320 may be incorporated within an apparatus suitable for grasp within a user's hand. In this way, the device may be portable allowing a user to utilize the specific phase bus reset generator of the present invention in multiple locations.

Figure 4:
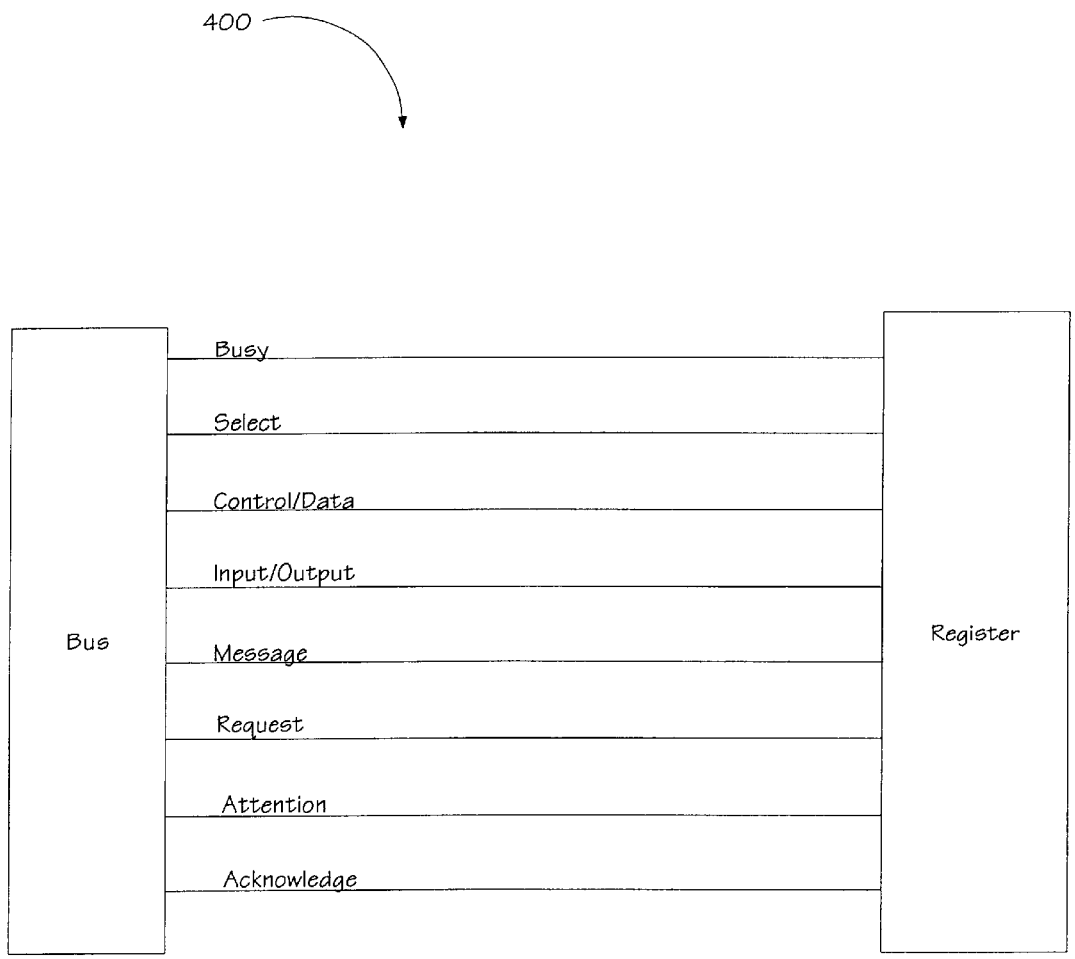
FIG. 4 depicts an exemplary embodiment of control signals received by a register for determination of a current phase in accordance with the present invention.

Referring now to FIG. 4, an exemplary embodiment of control signals 400 received by a register for determination of a current phase in accordance with the present invention is shown. The control signals received by a register 410 may include busy, select, control/data, input/output, message, request, attention, and acknowledge. Based upon the control signals, detection of a current phase may be accomplished. If the current phase is the desired phase to assert a reset, then a reset may be asserted. Upon the reset, all SCSI devices may be cleared from the bus.

It should be understood by one of ordinary skill in the art that various types of buses including SCSI buses may be utilized in accordance with the present invention without departing from the scope and spirit of the present invention. Examples of SCSI buses being only an exemplary embodiment of the present invention.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for asserting a bus reset, comprising:
   (a) analyzing a set of control signals from a bus;
   (b) determining a current phase of said bus; and
   (c) asserting a bus reset when said current phase is a desired phase for asserting a reset.

2. The method as claimed in claim 1, wherein said bus is in accordance with Small Computer System Interface standard.

3. The method as claimed in claim 1, wherein said set of control signals include busy, select, control/data, input/output, message, request, attention and acknowledge.

4. The method as claimed in claim 1, wherein a user is capable of selecting said desired phase.

5. The method as claimed in claim 1, wherein said current phase is at least one of bus free, message in, message out, command, st data in, st data out, dt data in, dt data out, selection, reselection, and status.

6. The method as claimed in claim 1, further comprising the step of searching each phase of said bus and asserting a bus reset upon detection of each phase.

7. A bus reset generator, comprising:
   (a) a register operably connected to a bus, said register suitable for receiving a set of control signals from said bus
   (b) a script processor operably connected to said register, said script processor being capable of processing a current phase of said bus, wherein, said script processor is capable of asserting a reset of said bus when said current phase is a desired phase for asserting a reset.

8. The bus reset generator as claimed in claim 7, wherein said bus is in accordance with Small Computer System Interface standard.

9. The bus reset generator as claimed in claim 7, wherein said set of control signals include busy, select, control/data, input/output, message, request, attention and acknowledge.

10. The bus reset generator as claimed in claim 7, wherein said register is an 8-bit read-only register.

11. The bus reset generator as claimed in claim 7, wherein said script processor is capable of asserting a reset upon said desired phase, said desired phase being selected by a user.

12. The bus reset generator as claimed in claim 7, wherein said current phase is at least one of bus free, message in, message out, command, st data in, st data out, dt data in, dt data out, selection, reselection, and status.

13. The bus reset generator as claimed in claim 7, wherein said script processor is capable of asserting a reset upon each operating phase of said bus such that a reset has been asserted on all phases.

14. A bus reset generator, comprising:
   (a) means for analyzing a set of control signals from a bus;
   (b) means for determining a current phase of said bus from said set of control signals; and
   (c) means for asserting a bus reset when said current phase is a desired phase for asserting a reset.

15. The bus reset generator as claimed in claim 14, wherein said bus is in accordance with Small Computer System Interface standard.

16. The bus reset generator as claimed in claim 14, wherein said set of control signals include busy, select, control/data, input/output, message, request, attention and acknowledge.

17. The bus reset generator as claimed in claim 14, wherein said asserting means is capable of asserting a reset upon said desired phase, said desired phase being selected by a user.

18. The bus reset generator as claimed in claim 14, wherein said current phase is at least one of bus free, message in, message out, command, st data in, st data out, dt data in, dt data out, selection, reselection, and status.

19. The bus reset generator as claimed in claim 14, wherein said asserting means is capable of asserting a reset upon each operating phase of said bus such that a reset has been asserted on all phases.

* * * * *